United States Patent
Okuyama et al.

(10) Patent No.: US 11,338,493 B2
(45) Date of Patent: May 24, 2022

(54) TWO STAGE LIQUID BLOW MOLDING METHOD WITH HEAT SENSITIVE INGREDIENT

(71) Applicants: Yuichi Okuyama, Tokyo (JP); Mitsuru Shiokawa, Tokyo (JP)

(72) Inventors: Yuichi Okuyama, Tokyo (JP); Mitsuru Shiokawa, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 193 days.

(21) Appl. No.: 15/772,768

(22) PCT Filed: Oct. 17, 2016

(86) PCT No.: PCT/JP2016/080731
§ 371 (c)(1),
(2) Date: May 1, 2018

(87) PCT Pub. No.: WO2017/090338
PCT Pub. Date: Jun. 1, 2017

(65) Prior Publication Data
US 2018/0319070 A1    Nov. 8, 2018

(30) Foreign Application Priority Data
Nov. 27, 2015   (JP) .............................. JP2015-232346

(51) Int. Cl.
*B29C 49/46*   (2006.01)
*B29C 49/18*   (2006.01)
(Continued)

(52) U.S. Cl.
CPC .............. *B29C 49/46* (2013.01); *B29C 49/18* (2013.01); *B29C 49/4268* (2013.01);
(Continued)

(58) Field of Classification Search
CPC .... B29C 2049/4652; B29C 2049/4655; B29C 2049/4658; B29C 2049/4664
See application file for complete search history.

(56) References Cited

U.S. PATENT DOCUMENTS 6,720,047 B2 *   4/2004   Kikuchi .................. B29B 11/12
                                                              264/322
10,011,808 B2 *  7/2018   Chan ...................... C11D 3/384
(Continued)

FOREIGN PATENT DOCUMENTS

CN      104797499 A     7/2015
JP      2013-154617 A   8/2013
(Continued)

OTHER PUBLICATIONS

Professor Shapely, Henry's Law and Dissolved Carbon Dioxide, Jun. 13, 2013, available at https://web.archive.org/web/20130613011819/http://butane.chem.uiuc.edu/pshapley/GenChem1/L23/web-L23.pdf (Year: 2013).*

(Continued)

*Primary Examiner* — Niki Bakhtiari
*Assistant Examiner* — Nicholas J Chidiac
(74) *Attorney, Agent, or Firm* — Oliff PLC

(57) ABSTRACT

A liquid blow molding method molds a bottomed tubular-shaped preform into a liquid-containing container in which a content liquid is held. The liquid blow molding method includes: a first molding step of liquid blow molding the preform into a halfway shape by supplying, into the preform that has been heated to a predetermined temperature, a first liquid at a predetermined pressure through a nozzle unit; and a second molding step, performed after the first molding step, of liquid blow molding the preform by supplying a second liquid into the preform at a predetermined pressure through the nozzle unit.

6 Claims, 6 Drawing Sheets

(51) Int. Cl.
*B29C 49/42* (2006.01)
*B29C 49/58* (2006.01)
*B29C 49/12* (2006.01)
*B29C 49/28* (2006.01)
*B29K 23/00* (2006.01)
*B29K 67/00* (2006.01)
*B29C 49/66* (2006.01)
*B29L 31/00* (2006.01)

(52) U.S. Cl.
CPC .......... *B29C 49/4289* (2013.01); *B29C 49/12* (2013.01); *B29C 49/28* (2013.01); *B29C 49/66* (2013.01); *B29C 2049/4655* (2013.01); *B29C 2049/4658* (2013.01); *B29C 2049/4664* (2013.01); *B29C 2049/4694* (2013.01); *B29C 2049/5841* (2013.01); *B29K 2023/12* (2013.01); *B29K 2067/003* (2013.01); *B29L 2031/7158* (2013.01)

(56) References Cited

U.S. PATENT DOCUMENTS

| | | | | |
|---|---|---|---|---|
| 10,179,892 | B2* | 1/2019 | Chan ........................ | C11D 3/32 |
| 10,597,613 | B2* | 3/2020 | Chan .................... | C11D 3/3719 |
| 10,995,303 | B2* | 5/2021 | Chan .................. | C11D 3/38609 |
| 2003/0104146 | A1* | 6/2003 | Kikuchi .............. | B29C 49/0005 |
| | | | | 428/34.7 |
| 2006/0127615 | A1* | 6/2006 | Kikuchi .................. | B29B 11/12 |
| | | | | 428/35.7 |
| 2009/0035502 | A1* | 2/2009 | Tammaji ................ | C08G 63/78 |
| | | | | 428/36.4 |
| 2009/0317577 | A1* | 12/2009 | Kikuchi .................. | B29C 49/02 |
| | | | | 428/36.92 |
| 2012/0315348 | A1* | 12/2012 | Wilson .................... | B29C 49/46 |
| | | | | 425/149 |
| 2013/0313761 | A1 | 11/2013 | Haesendonckx et al. | |
| 2015/0132832 | A1* | 5/2015 | Chan ..................... | C11D 3/384 |
| | | | | 435/264 |
| 2015/0132833 | A1* | 5/2015 | Chan ........................ | C11D 3/32 |
| | | | | 435/264 |
| 2015/0231812 | A1* | 8/2015 | Klatt ....................... | B65B 3/022 |
| | | | | 264/532 |
| 2018/0282668 | A1* | 10/2018 | Chan .................... | C11D 3/3719 |
| 2019/0093053 | A1* | 3/2019 | Chan ........................ | C11D 3/32 |
| 2021/0292682 | A1* | 9/2021 | Chan .................... | C11D 3/3723 |

FOREIGN PATENT DOCUMENTS

| | | |
|---|---|---|
| JP | 2013-208834 A | 10/2013 |
| JP | 2014-519429 A | 8/2014 |
| JP | 2015-139988 A | 8/2015 |
| JP | 2015-160432 A | 9/2015 |
| WO | 2012/170517 A2 | 12/2012 |
| WO | 2014/206978 A1 | 12/2014 |
| WO | 2014/209346 A1 | 12/2014 |
| WO | 2015/052277 A1 | 4/2015 |

OTHER PUBLICATIONS

Jul. 23, 2019 Office Action issued in Japanese Patent Application No. 2015-232346.
Mar. 26, 2019 Office Action issued in Japanese Patent Application No. 2015-232346.
May 9, 2019 Extended Search Report issued in European Patent Application No. 16868287.0.
Dec. 6, 2016 International Search Report issued in International Patent Application No. PCT/JP2016/080731.
Jul. 29, 2019 Office Action issued in Chinese Patent Application No. 201680066367.0.
May 29, 2018 International Preliminary Report on Patentability issued in International Patent Application No. PCT/JP2016/080731.
Aug. 3, 2020 Office Action issued in Chinese Patent Application No. 201680066367.0.
Feb. 18, 2020 Office Action issued in Chinese Patent Application No. 201680066367.0.
Nov. 12, 2020 Office Action issued in European Patent Application No. 16868287.0.
Dec. 1, 2020 Office Action issued in Chinese Patent Application No. 201680066367.0.

* cited by examiner

TWO STAGE LIQUID BLOW MOLDING METHOD WITH HEAT SENSITIVE INGREDIENT

TECHNICAL FIELD

The present disclosure relates to a liquid blow molding method for molding a bottomed tubular-shaped preform into a liquid-containing container in which a content liquid is held. The present disclosure especially relates to a liquid blow molding method for molding a liquid-containing container in which a mixed liquid of a first liquid and a second liquid is held as the content liquid.

BACKGROUND

Resin-made containers, typical examples of which are polypropylene (PP) bottles and polyethylene terephthalate (PET) bottles, are used to hold a variety of liquids, such as a beverage, a cosmetic product, a pharmaceutical product, a detergent, and a toiletry including shampoo, as the content liquids. Such a container is generally produced by blow molding a preform that has been formed by a thermoplastic resin material as mentioned above in a bottomed tubular shape.

As an example of blow molding used to mold a preform into a container, liquid blow molding is known. In liquid blow molding, a pressurized liquid is used as a pressurizing medium supplied into the preform.

Patent Literature 1, for example, describes a liquid blow molding method for molding a preform into a container having a predetermined shape conforming to a cavity of a mold used for blow molding by placing, in the mold, the preform heated in advance to a temperature at which stretchability is achieved and by supplying, into the preform, a liquid pressurized to a predetermined pressure through a nozzle. According to the liquid blow molding method, since the content liquid, such as a beverage, to be held in the container as a final product may be used as the liquid supplied into the preform, the liquid-containing container in which the content liquid is held is molded easily by molding the container simultaneously with filling the content liquid into the container, and the process of filling the content liquid to the container after molding may be omitted. Accordingly, the production process and the configuration of production line (apparatus) may be simplified.

CITATION LIST

Patent Literature

PTL1: JP2013208834A

SUMMARY

Technical Problem

However, regarding a liquid-containing container configured to hold a liquid that contains a heat-sensitive ingredient as the content liquid, there is a problem that the aforementioned conventional liquid blow molding method is difficult to adopt. The reason is that in the aforementioned conventional liquid blow molding method, in which liquid blow molding is performed by supplying the pressurized liquid into the preform that has been heated to the temperature at which stretchability is achieved, the heat-sensitive ingredient may undergo deterioration such as denaturation and deactivation due to the heat of the preform. For example, assume a case where a liquid-containing container holding, as the content liquid, an enzyme liquid detergent containing the heat-sensitive ingredient is molded. In this case, when the liquid detergent is supplied into the heated preform, enzyme contained in the liquid detergent undergoes denaturation or deactivation (deterioration) due to the heat of the preform, and a predetermined effect may be lost when the liquid detergent is used by a consumer.

Similarly, regarding a container configured to hold a liquid, such as a seasoning dressing in which one liquid mainly composed of oil and another liquid mainly composed of water are mixed, that is difficult to be maintained in a uniform mixed state, there is a problem that the aforementioned conventional liquid blow molding method is difficult to adopt. The reason is that it is difficult for the aforementioned conventional liquid blow molding method to supply the liquid into the preform through the nozzle while maintaining the liquid in the uniform mixed state.

The present disclosure has been conceived in view of the above problem, and the present disclosure is to provide a liquid blow molding method that may be adopted to mold a liquid-containing container holding a content liquid including a heat-sensitive ingredient and to mold a liquid-containing container holding a content liquid including two types of liquids that is difficult to be maintained in the uniform mixed state.

Solution to Problem

One of aspects of the present disclosure resides in a liquid blow molding method for molding a bottomed tubular-shaped preform into a liquid-containing container in which a content liquid is held. The liquid blow molding method includes: a first molding step of liquid blow molding the preform into a halfway shape by supplying, into the preform that has been heated to a predetermined temperature, a first liquid at a predetermined pressure through a nozzle; and a second molding step, performed after the first molding step, of liquid blow molding the preform by supplying a second liquid into the preform at a predetermined pressure through the nozzle.

In a preferred embodiment of the presently disclosed liquid blow molding method configured as above, in the second molding step, the first liquid, together with the second liquid, is supplied into the preform at a predetermined pressure.

In another preferred embodiment of the presently disclosed liquid blow molding method configured as above, in the second molding step, a pressure of the first liquid supplied to the preform is set higher than a pressure inside the liquid blow molded preform, and a pressure of the second liquid supplied to the preform is set the same as or higher than the pressure of the first liquid supplied to the preform.

In yet another preferred embodiment of the presently disclosed liquid blow molding method configured as above, the liquid blow molding method further includes a cleaning step, performed after the second molding step, of removing the second liquid out of the nozzle by liquid blow molding the preform by supplying only the first liquid into the preform at a predetermined pressure through the nozzle.

In yet another preferred embodiment of the presently disclosed liquid blow molding method configured as above, the liquid blow molding method further includes a circulation step, performed before the first molding step, of circulating the first liquid between a tank configured to hold the first liquid and the nozzle.

Advantageous Effect

The present disclosure provides a liquid blow molding method that may be adopted to mold a liquid-containing container holding a content liquid including a heat-sensitive ingredient and to mold a liquid-containing container holding a content liquid including two types of liquids that is difficult to be maintained in the uniform mixed state.

DETAILED DESCRIPTION

The present disclosure will be described in more detail below by illustration with reference to the drawings.

A liquid blow molding method for molding a bottomed tubular-shaped preform into a liquid-containing container in which a content liquid is held according to the present disclosure includes: a first molding step of liquid blow molding the preform into a halfway shape by supplying, into the preform that has been heated to a predetermined temperature, a first liquid at a predetermined pressure through a nozzle; and a second molding step, performed after the first molding step, of liquid blow molding the preform by supplying a second liquid into the preform at a predetermined pressure through the nozzle. That is to say, the presently disclosed liquid blow molding method is configured, in a case where the content liquid held in the liquid-containing container after molding is a mixed liquid of the first liquid and the second liquid, to firstly supply only the first liquid to the preform for liquid blow molding and subsequently supply the second liquid to the preform for liquid blow molding. The presently disclosed liquid blow molding method may be implemented by using, for example, a liquid blow molding apparatus 1 with a configuration illustrated in FIG. 1.

Figure 1:
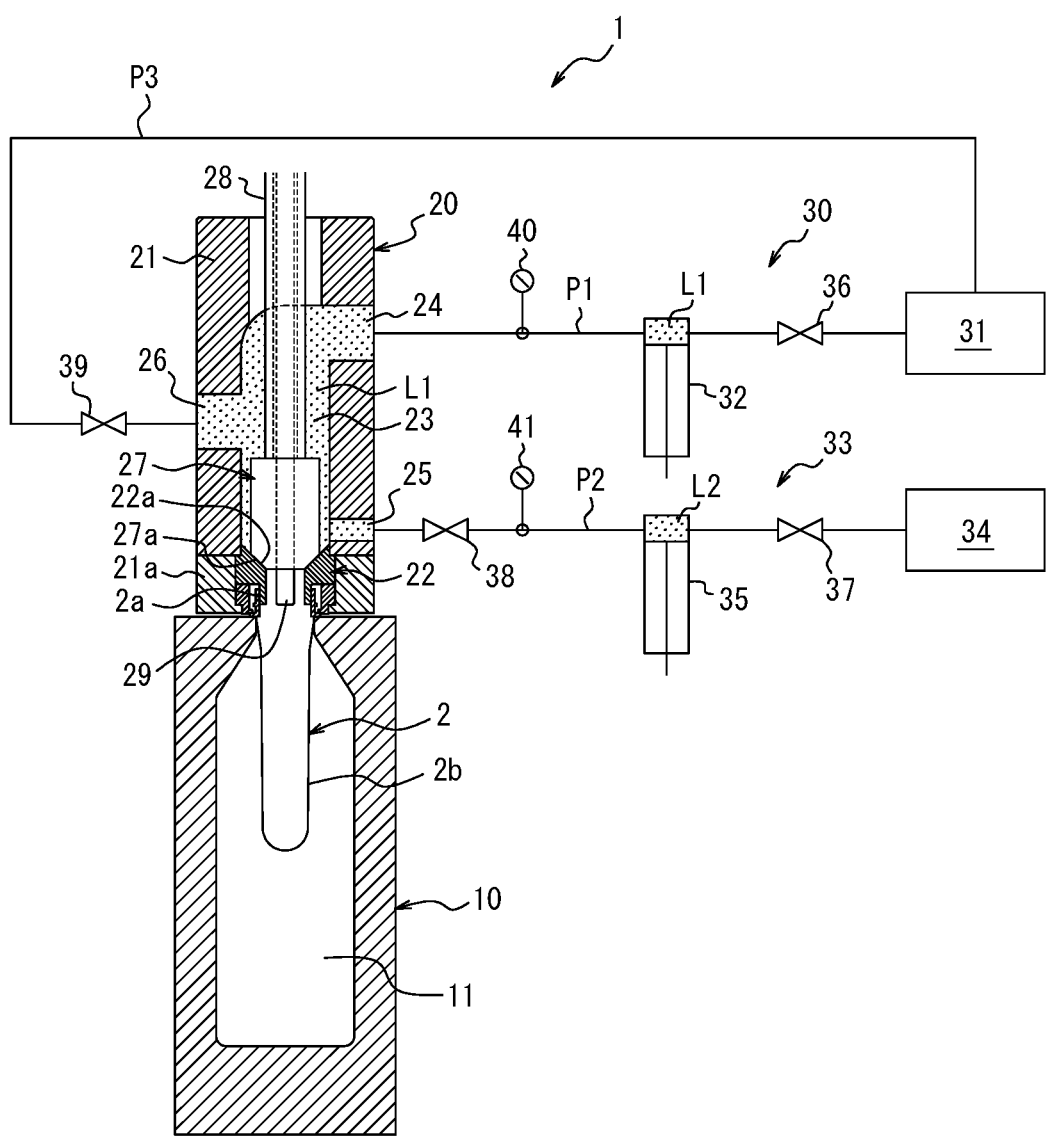
FIG. 1 illustrates an example of a liquid blow molding apparatus that is used to implement a liquid blow molding method according to one of embodiments of the present disclosure.

The liquid blow molding apparatus 1 illustrated in FIG. 1 is configured to liquid blow mold a preform 2 into the liquid-containing container holding therein the content liquid. Liquid blow molding refers to blow molding using a pressurized liquid, instead of pressurized air that is used in air blow molding, as a pressurizing medium (pressurizing liquid) supplied to the preform 2.

The liquid L supplied to the preform 2, that is, the content liquid L to be held in the liquid-containing container after molding, is the mixed liquid of the first liquid L1 and the second liquid L2. A liquid that is insusceptible to degradation such as thermal denaturation and deactivation (i.e., that does not contain an ingredient which is degraded by heat) is preferably used as the first liquid L1, while a liquid that contains an ingredient which is easily degraded by heat may be used as the second liquid L2. The present embodiment illustrates a case in which an enzyme liquid detergent is used as the content liquid L. In this case, the first liquid L1 is a liquid that does not contain enzyme (i.e., a heat-resistant liquid), and the second liquid L2 is a liquid containing enzyme (i.e., a heat-sensitive liquid). Additionally, the first liquid L1 and the second liquid L2 may be mainly composed of a common liquid ingredient or different liquid ingredients.

Additionally, a variety of liquids other than the aforementioned enzyme liquid detergent may be used as the mixed liquid (liquid L) of the heat-resistant first liquid L1 and the heat-sensitive second liquid L2.

Furthermore, the liquid L supplied to the preform 2 is not limited to the mixed liquid of the heat-resistant first liquid L1 and the heat-sensitive second liquid L2 as described above, and a liquid in which it is difficult to maintain the first and second liquids in the mixed state at the time of liquid blow molding may also be used as the liquid L. Examples of such a liquid may include a seasoning dressing in which one liquid (the first liquid) mainly composed of oil and another liquid (the second liquid) mainly composed of water and having properties to be easily separated from oil are mixed.

As the preform 2, a preform may be used that has been formed by a thermoplastic resin material, such as polypropylene (PP) and polyethylene terephthalate (PET), in a bottomed tubular shape having a cylindrical-shaped mouth 2a as an opening end and a cylindrical-shaped trunk 2b, which is connected to the mouth 2a and which has a lower end that is closed. Note that in the drawings the trunk 2b is depicted with the thickness being omitted for convenience.

The preform 2 does not necessarily have the aforementioned shape and may have a variety of bottomed tubular shapes depending on the shape of the container after molding.

Although not illustrated in detail, the mouth 2a is provided, on an outer wall surface thereof, with an engagement projection to attach a closing cap (which is not illustrated) to the mouth 2a of the liquid-containing container after molding by plugging (undercut engagement). Additionally, a male screw, instead of the engagement projection, may also be provided on the outer wall surface of the mouth 2a, and the closing cap may be attached to the mouth 2a by screw connection.

The liquid blow molding apparatus 1 includes a mold 10 used for blow molding. The mold 10 has a cavity 11, which has a shape corresponding to the final shape, such as a bottle shape, of the container. The cavity 11 is open upward on an upper surface of the mold 10. The preform 2 is fitted in the mold 10, with the trunk 2b being arranged within the cavity 11 of the mold 10 and with the mouth 2a protruding upward from the mold 10.

Although not illustrated in detail, the mold 10 may be opened into left and right mold halves, and the liquid-containing container may be removed from the mold 10 by opening the mold 10 into the left and right halves after the preform 2 is molded into the liquid-containing container.

Above the mold 10, there is disposed a nozzle unit 20, which serves as a nozzle to supply the liquid into the preform 2. The nozzle unit 20 includes a main body block 21, which is displaceable in upward and downward directions relative to the mold 10. The main body block 21 is provided, in a lower end thereof, with a support block 21a, and a blow nozzle 22 is supported by the support block 21a to be attached to the lower end of the main body block 21. The blow nozzle 22 is formed in a substantially cylindrical shape and configured to engage, from above, with the mouth 2a of the preform 2 fitted in the mold 10 when the main body block 21 is displaced downward to the lowermost stroke end. The blow nozzle 22 is provided, on an upper surface thereof, with a sealing surface 22a, which has a conical surface shape tapered with a diameter decreasing downward.

The main body block 21 is provided, inside thereof, with a supply path 23, which extends vertically. The supply path 23 is a flow path used to supply the first liquid L1 and the second liquid L2 to the blow nozzle 22, and the supply path 23 in a lower end thereof communicates with the blow nozzle 22. The main body block 21 is also provided with a first supply port 24, which communicates with an upper end of the supply path 23, a second supply port 25, which communicates with the lower end side of the supply path 23, and a circulation port 26, which communicates with a middle portion of the supply path 23.

In the supply path 23, a sealing body 27, which is configured to open and close the blow nozzle 22, is disposed. The sealing body 27 is fixed to a lower end of a shaft body 28, which is disposed in the nozzle unit 20 in a manner such that the shaft body 28 is displaceable in the upward and downward directions. Thus, the sealing body 27 is displaceable in the upward and downward directions inside the supply path 23. The sealing body 27 is formed in a cylindrical shape and provided, in an outer peripheral portion of a lower end surface thereof, with a tapered abutment surface 27a. The abutment surface 27a has the same inclination angle as that of the sealing surface 22a of the blow nozzle 22, so that the abutment surface 27a may closely contact the sealing surface 22a when the sealing body 27 is displaced to a closed position, that is, a lowermost stroke end position. Accordingly, when the sealing body 27 reaches the closed position, the blow nozzle 22 is closed by the sealing body 27, and the communication between the blow nozzle 22 and the supply path 23 is blocked. On the other hand, when the sealing body 27 is displaced upward from the closed position, the blow nozzle 22 is opened to communicate with the supply path 23.

As illustrated, the liquid blow molding apparatus 1 may include a stretching rod 29. In this case, biaxial stretch blow molding may be performed. In biaxial stretch blow molding, the preform 2 is stretched in the axis direction by the stretching rod 29 while being stretched in the radial direction by the pressurized liquid supplied through the mouth 2a. Additionally, the liquid blow molding apparatus 1 does not necessarily include the stretching rod 29.

A first liquid supply unit 30 is connected to the first supply port 24 through a first pipe P1. The first liquid supply unit 30 includes a first tank 31 and a first pressurizing source 32, which is connected to the downstream side of the first tank 31. The first tank 31 may be configured to hold the first liquid L1 and to heat the first liquid L1 to a predetermined temperature and keep the first liquid L1 at the predetermined temperature. The first pressurizing source 32 is configured to draw the first liquid L1 held in the first tank 31 and to pressurize the drawn first liquid L1 to a predetermined pressure and supply the pressurized first liquid L1 to the supply path 23 through the first supply port 24.

A second liquid supply unit 33 is connected to the second supply port 25 through a second pipe P2. The second liquid supply unit 33 includes a second tank 34 and a second pressurizing source 35, which is connected to the downstream side of the second tank 34. The second tank 34 holds the second liquid L2. The second pressurizing source 35 is configured to draw the second liquid L2 held in the second tank 34 and to pressurize the drawn second liquid L2 to a predetermined pressure and supply the pressurized second liquid L2 to the supply path 23 through the second supply port 25.

In the illustrated example, the first pressurizing source 32 and the second pressurizing source 35 are each configured by a plunger pump. Additionally, the first pressurizing source 32 and the second pressurizing source 35 are not limited to the plunger pumps and may be configured by differently configured pressurizing sources that are capable of pressurizing the first liquid L1 held in the first tank 31 to the predetermined pressure and pressurizing the second liquid L2 held in the second tank 34 to the predetermined pressure and supplying the pressurized first liquid L1 and second liquid L2 to the supply path 23.

The circulation port 26 is connected to the first tank 31 through a circulation pipe P3, so that the first liquid L1 supplied from the first pressurizing source 32 to the supply path 23 may be returned to the first tank 31 through the circulation pipe P3. The first tank 31 has a circulation function that allows the first liquid L1 to be circulated between the first tank 31 and the supply path 23, that is, between the first tank 31 and the nozzle unit 20, without being retained inside the supply path 23 in a standby state where liquid blow molding is not performed.

A first opening-closing valve 36 is disposed between the first tank 31 and the first pressurizing source 32, and a second opening-closing valve 37 is disposed between the second tank 34 and the second pressurizing source 35. Furthermore, a third opening-closing valve 38 is disposed between the second pressurizing source 35 and the second supply port 25. Moreover, a circulation control opening-closing valve 39 is disposed between the circulation port 26 and the first tank 31. Each of these opening-closing valves 36 to 39 is configured by an electromagnetic valve and operates to open and close to switch the corresponding pipe P1, P2, or P3 between a closed state and an opened state. Furthermore, the opening-closing valves 36 to 39 are controlled to open and close at predetermined timings by a control unit or the like which is not illustrated.

A first pressure gauge 40 is further disposed in the first pipe P1, and a second pressure gauge 41 is further disposed in the second pipe P2. Data measured by the pressure gauges 40 and 41 is inputted to the control unit which is not illustrated.

The control unit which is not illustrated is also connected to the first liquid supply unit 30 and the second liquid supply unit 33, and the operation of the liquid blow molding apparatus 1 is integratedly controlled by the control unit.

Next, a description is given of a method (i.e., liquid blow molding method according to the present disclosure) for molding the preform 2 into the liquid-containing container in which the content liquid is held inside the container having a predetermined shape by using the liquid blow molding apparatus 1 with the above configuration.

Firstly, the preform 2 that has been heated in advance to the predetermined temperature (e.g., from 80° C. to 150° C.) around which stretchability is achieved by using a heating unit (which is not illustrated) such as a heater is fitted in the mold 10 used for blow molding, and the mold 10 is closed. Then, the nozzle unit 20 is displaced downward to engage the blow nozzle 22 to the mouth 2a of the preform 2.

Figure 2:
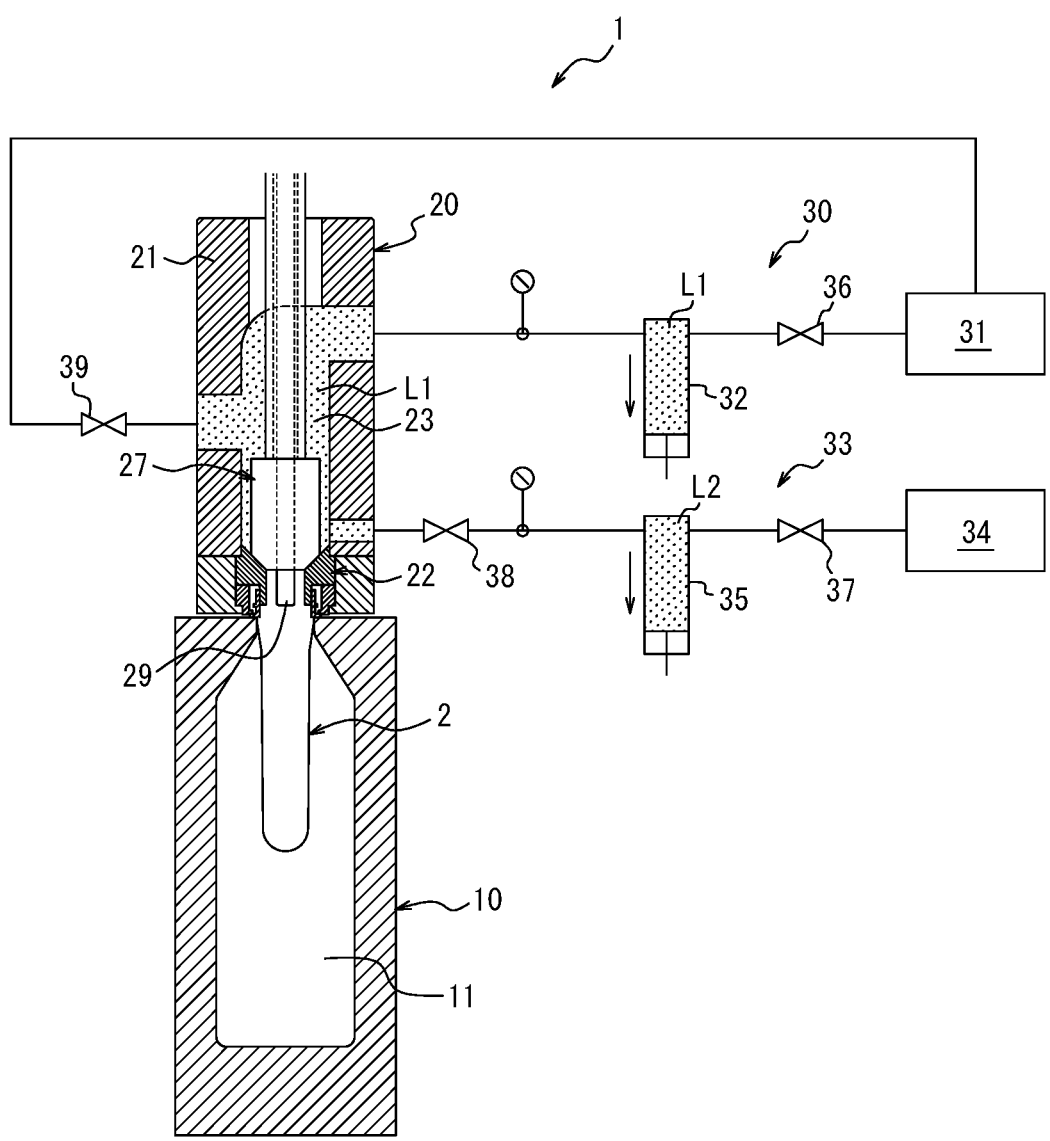
FIG. 2 illustrates the liquid blow molding apparatus in a standby state.

Subsequently, as illustrated in FIG. 2, the first opening-closing valve 36 is opened, and the first pressurizing source 32 is subject to pull operation, while the sealing body 27 remains closed, thereby drawing the first liquid L1 held in the first tank 31 by the first pressurizing source 32 to be filled in the first pressurizing source 32. At the same time, the second opening-closing valve 37 is opened, the third opening-closing valve 38 is closed, and the second pressurizing source 35 is subject to pull operation, thereby drawing the second liquid L2 held in the second tank 34 by the second pressurizing source 35 to be filled in the second pressurizing source 35. In this state, the liquid blow molding apparatus 1 is kept in the standby state until liquid blow molding is performed.

The presently disclosed liquid blow molding method may include a circulation step performed in the aforementioned standby state. That is to say, by opening the circulation control opening-closing valve 39 in the standby state, the first liquid L1 may be circulated between the first tank 31 and the nozzle unit 20 due to the circulation function of the first tank 31. This allows the temperature of the first liquid L1 in the supply path 23 to be maintained at the predetermined temperature suitable for liquid blow molding by letting the first tank 31 always circulate the first liquid L1 regulated at the predetermined temperature through the supply path 23 without retaining the first liquid L1 inside the supply path 23 in the standby state before liquid blow molding is performed.

Subsequently, liquid blow molding is performed. In the presently disclosed liquid blow molding method, liquid blow molding is performed in two divided steps, namely, the first molding step and the second molding step.

Figure 3:
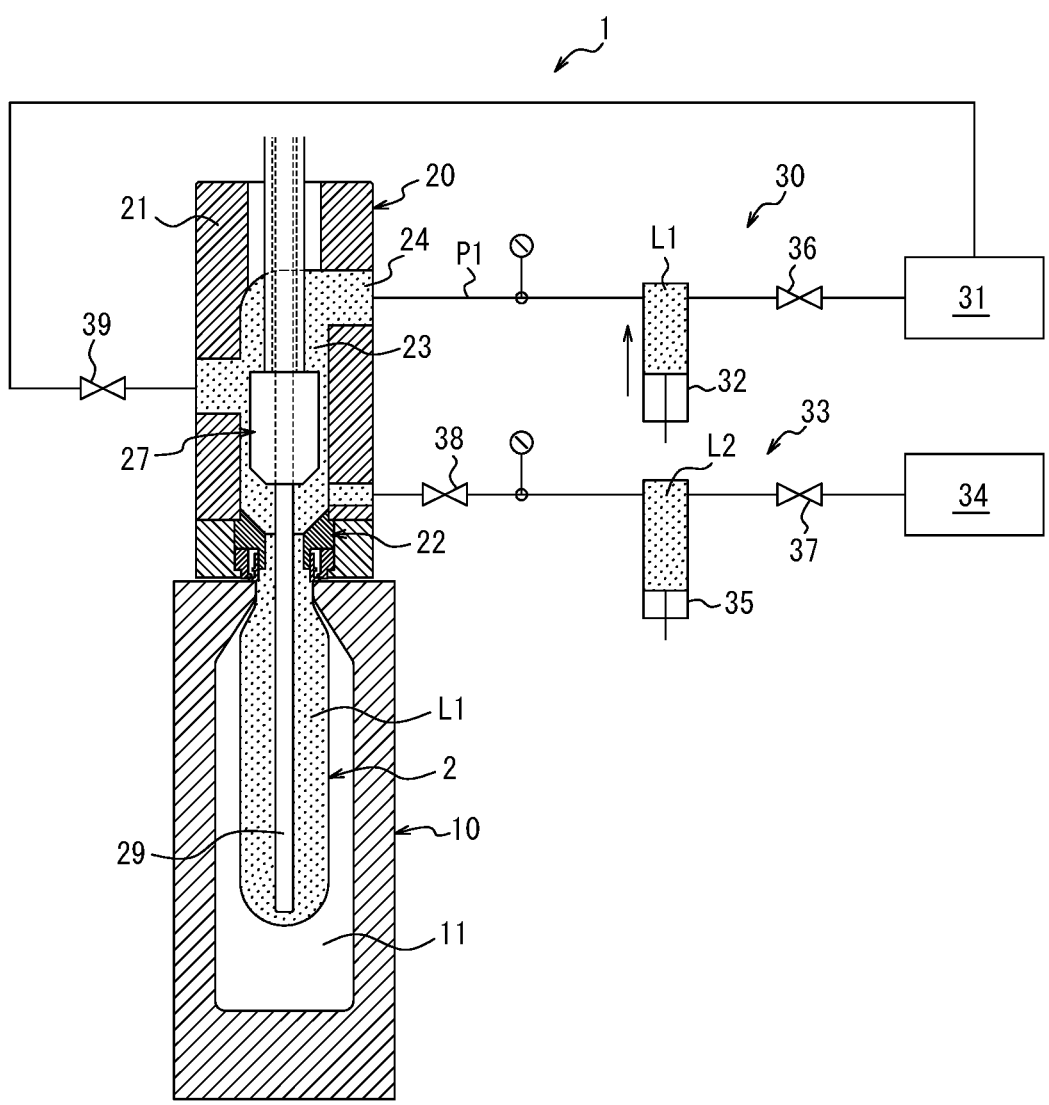
FIG. 3 illustrates the liquid blow molding apparatus in a state where a first molding step is performed.

As illustrated in FIG. 3, in the first molding step, the first pressurizing source 32 is operated in a state where the first opening-closing valve 36, the second opening-closing valve 37, the third opening-closing valve 38, and the circulation control opening-closing valve 39 are all closed and where the sealing body 27 is opened. At this time, the second pressurizing source 35 remains unoperated. Consequently, the preform 2 is liquid blow molded by supplying, into the preform 2 that has been heated to the predetermined temperature, only the first liquid L1 that is pressurized to the predetermined pressure higher than that of the inside of the cavity 11 and at the predetermined temperature from the first pressurizing source 32 through the first pipe P1, the first supply port 24, the supply path 23, and the blow nozzle 22. In the first molding step, the preform 2 is not molded into the perfect container shape conforming to the cavity 11 but molded into a halfway shape.

Additionally, when the stretching rod 29 is disposed, the preform 2 may be stretched by the stretching rod 29 in the longitudinal direction by displacing the stretching rod 29 downward before or during the first molding step.

Figure 4:
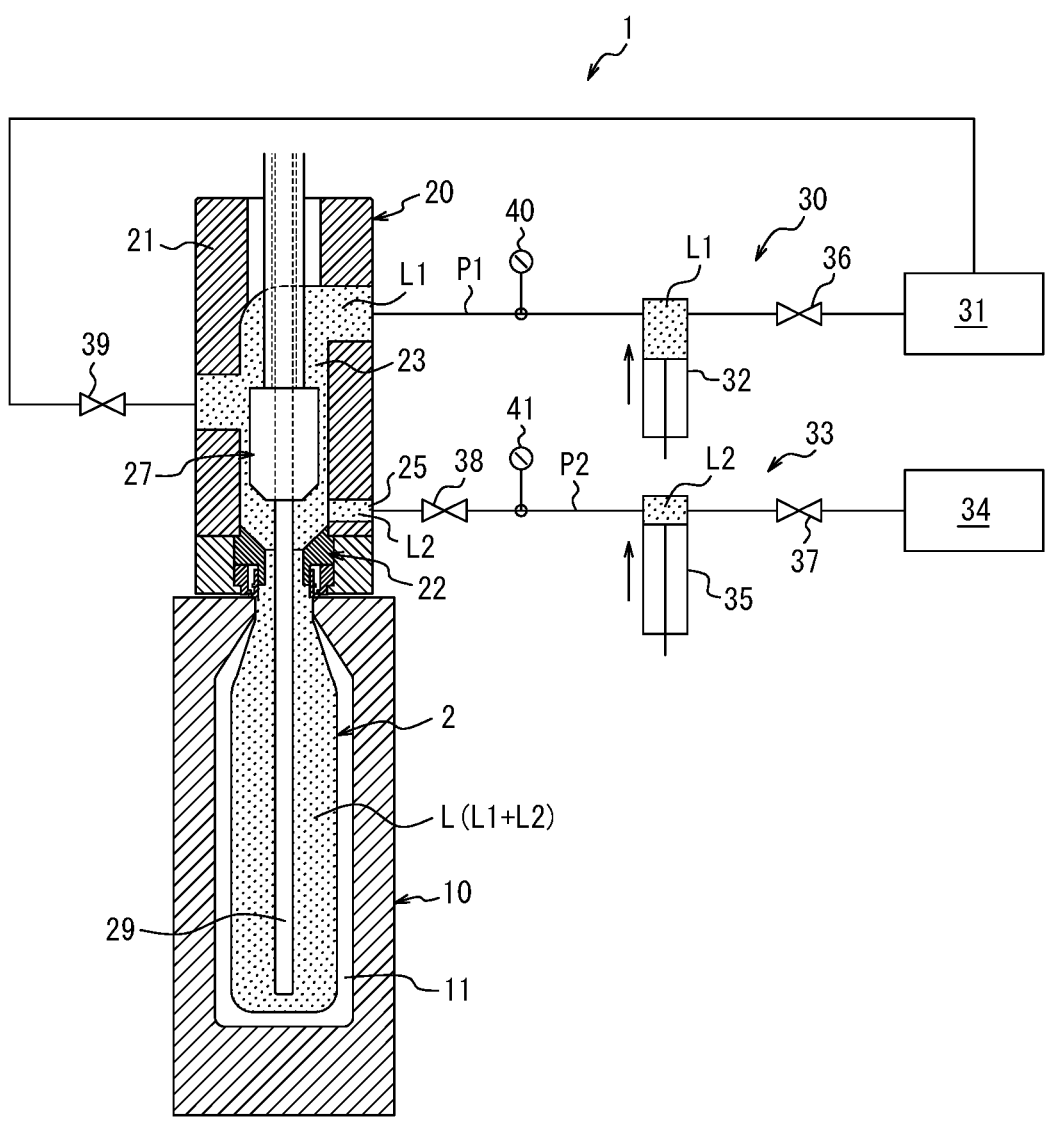
FIG. 4 illustrates the liquid blow molding apparatus in a state where a second molding step is performed.

After the first molding step ends, the second molding step is performed. As illustrated in FIG. 4, in the second molding step, the second pressurizing source 35, in addition to the first pressurizing source 32, is operated in a state where the first opening-closing valve 36, the second opening-closing valve 37, and the circulation control opening-closing valve 39 are all closed and where the third opening-closing valve 38 and the sealing body 27 are opened. Consequently, the second liquid L2 pressurized to the predetermined pressure is supplied into the preform 2 that has been molded into the halfway shape from the second pressurizing source 35 through the second pipe P2, the second supply port 25, the supply path 23, and the blow nozzle 22, while the supply of the first liquid L1 from the first pressurizing source 32 into the preform 2 is maintained. Accordingly, the preform 2 is liquid blow molded by the liquid L in which the two liquids, namely, the first liquid L1 and the second liquid L2, are mixed.

Note that, in the second molding step, a pressure PR2 of the second liquid L2 measured by the second pressure gauge 41 is the same as or higher than a pressure PR1 of the first liquid L1 measured by the first pressure gauge 40. The pressure PR1 of the first liquid L1 supplied into the preform 2 is higher than a pressure PR3 inside the preform 2 that is being liquid blow molded. Accordingly, even when the first liquid L1 and the second liquid L2 are simultaneously supplied to the preform 2, it is ensured that a predetermined amount of the second liquid L2 is supplied to the preform 2.

Additionally, when the stretching rod 29 is disposed, the preform 2 may also be stretched by the stretching rod 29 in the longitudinal direction by continuously displacing the stretching rod 29 downward in the second molding step.

The presently disclosed liquid blow molding method may include a cleaning step performed after the second molding step. In this case, in the second molding step, the preform 2 is not molded into the perfect container shape conforming to the cavity 11 but molded into a halfway shape.

Figure 5:
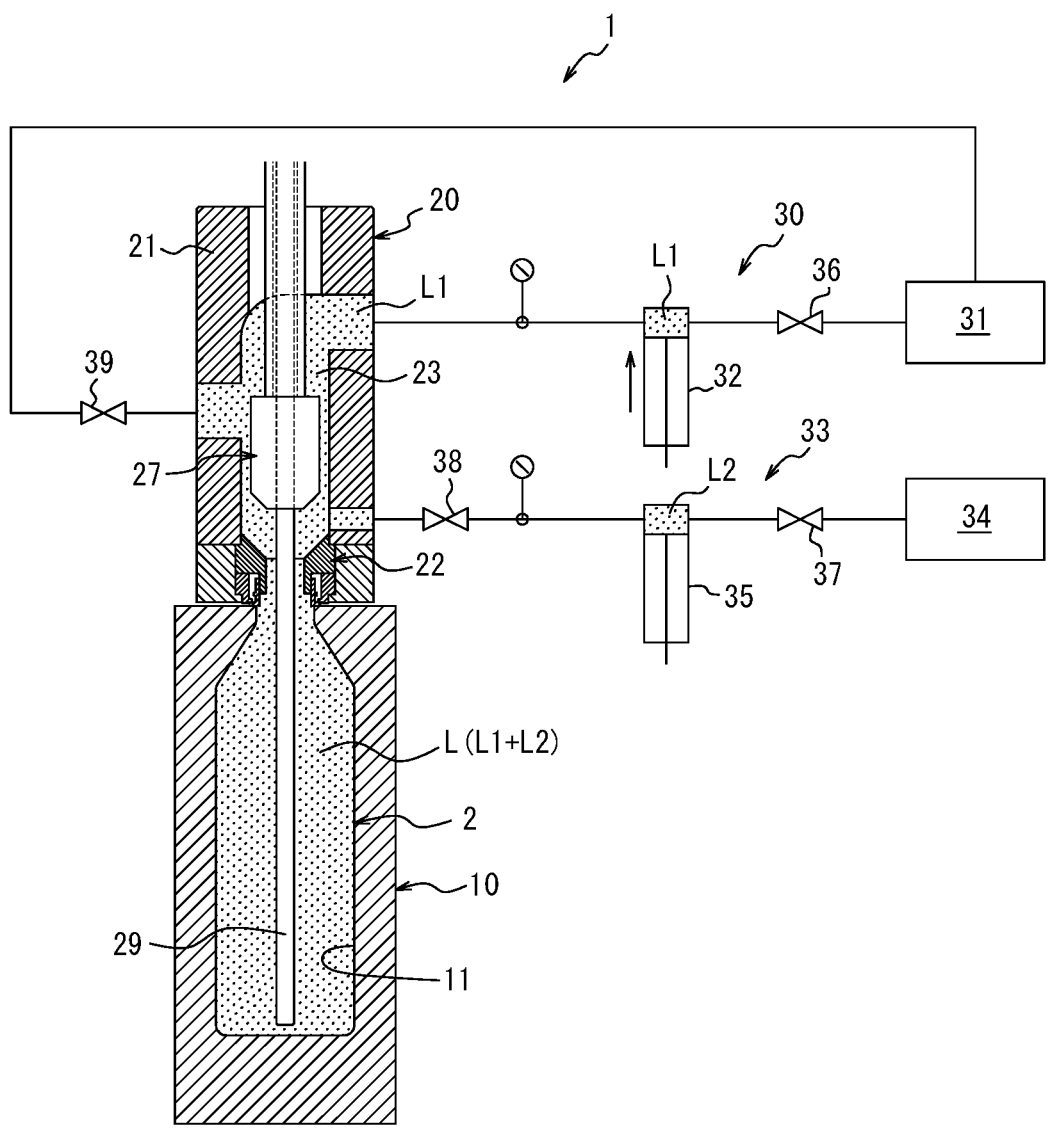
FIG. 5 illustrates the liquid blow molding apparatus in a state where a cleaning step is performed.

As illustrated in FIG. 5, in the cleaning step, the operation of the second pressurizing source 35 is stopped, and only the first pressurizing source 32 is operated in a state where the first opening-closing valve 36, the second opening-closing valve 37, the third opening-closing valve 38, and the circulation control opening-closing valve 39 are all closed and where the sealing body 27 is opened. Consequently, liquid blow molding is performed by supplying only the first liquid L1 to the preform 2 that has been molded into the halfway shape. Accordingly, the inside of the supply path 23 in the nozzle unit 20 is cleaned by the first liquid L1, and the second liquid L2 supplied to the supply path 23 in the second molding step is removed from the supply path 23. Thus performing the cleaning step prevents, at the time of liquid blow molding the next preform 2 after liquid blow molding of the preform 2 is completed, the second liquid L2 remaining in the supply path 23 in the second molding step from being supplied to the preform 2 heated to the predetermined temperature in the new first molding step, thereby preventing the deterioration or the like of the content liquid that is caused by heating of the second liquid L2.

Additionally, when the stretching rod 29 is disposed, the preform 2 may also be stretched by the stretching rod 29 in the longitudinal direction by continuously displacing the stretching rod 29 downward in the cleaning step.

Figure 6:
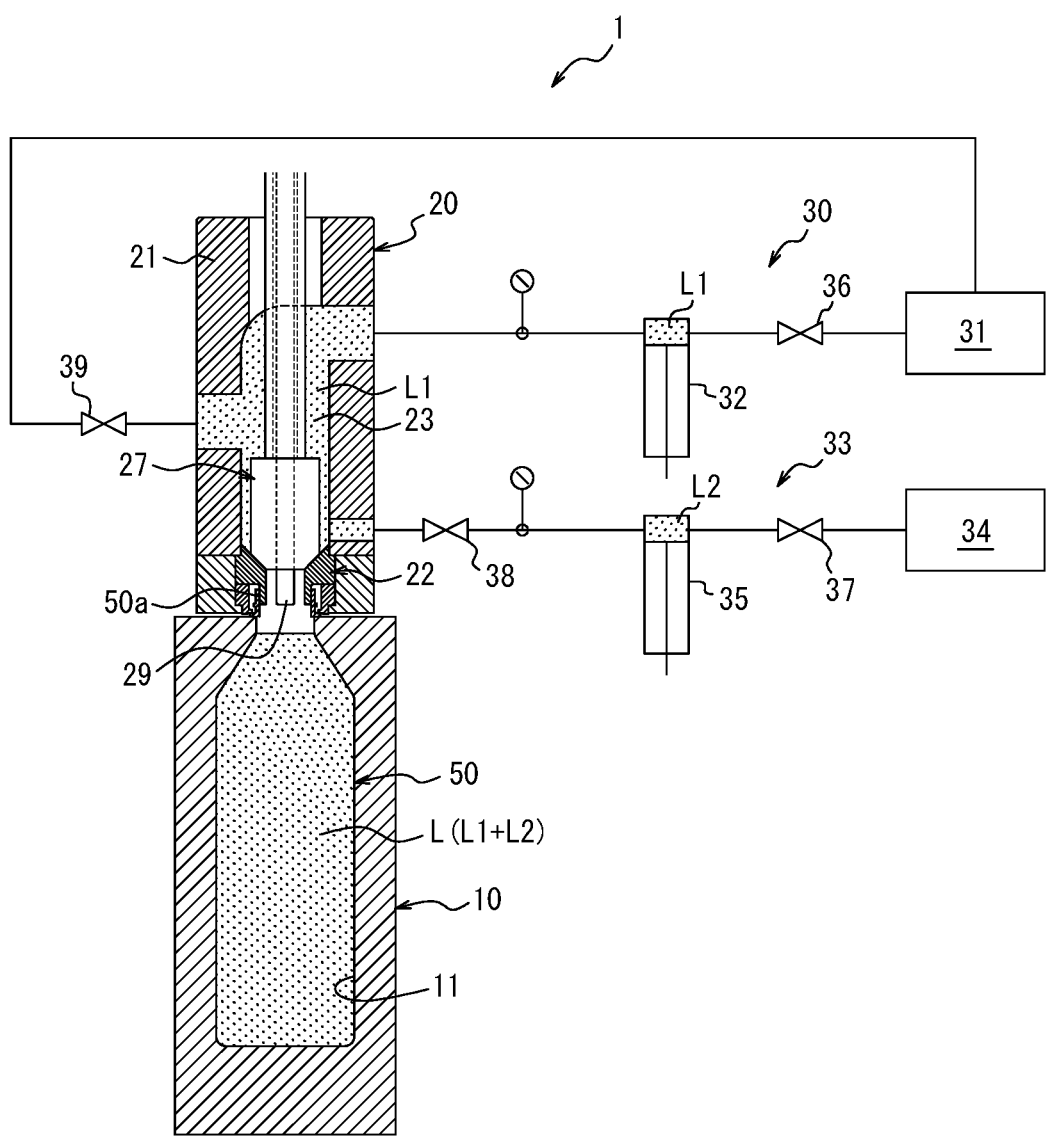
FIG. 6 illustrates the liquid blow molding apparatus in a state where liquid blow molding is completed.

After the cleaning step ends, as illustrated in FIG. 6, the sealing body 27 is closed, and liquid blow molding is completed. When liquid blow molding is completed, the preform 2 is molded into the liquid-containing container 50 in which the mixed content liquid L of the first liquid L1 and the second liquid L2 is held inside the container having the predetermined shape. A liquid level of the content liquid L, that is, the volume of the content liquid L, to be held in the liquid-containing container 50 after molding may be regulated appropriately by withdrawing the stretching rod 29 out of the content liquid L. Although not illustrated in detail, a cap is attached to the mouth 50a of the liquid-containing container 50 after molding, and subsequently, the mold 10 is opened to remove the completed liquid-containing container 50 from the mold 10. The cap may also be attached after the liquid-containing container 50 is removed from the mold 10.

After the liquid-containing container 50 is removed from the mold 10, as illustrated in FIG. 2, the liquid blow molding apparatus 1 enters the standby state ready for the next liquid blow molding by opening the first opening-closing valve 36 and subjecting the first pressurizing source 32 to pull operation to fill the first liquid L1 in the first pressurizing source 32 and by opening the second opening-closing valve 37, closing the third opening-closing valve 38, and subjecting the second pressurizing source 35 to pull operation to fill the second liquid L2 in the second pressurizing source 35.

In this way, the presently disclosed liquid blow molding method is configured to supply only the first liquid L1 to the preform 2 to liquid blow mold the preform 2 into the halfway shape and subsequently supply the second liquid L2 to the preform 2 for liquid blow molding. Accordingly, even in a case of molding the liquid-containing container 50 holding, as the content liquid L, the mixed liquid of the first liquid L1 and the second liquid L2 that contains a heat-sensitive ingredient, the preform 2 that has been heated to the predetermined temperature is cooled by the first liquid L1 before supplying the second liquid L2 to the preform 2, and the deterioration of the ingredient contained in the second liquid L2 due to heating by the heat of the preform 2 is prevented. This ensures the quality of the content liquid L to be held in the liquid-containing container 50 after molding. That is to say, using the presently disclosed liquid blow molding method allows liquid blow molding to be adopted to easily produce even the liquid-containing container 50 holding the content liquid L that contains a heat-sensitive ingredient.

Furthermore, with the configuration in which liquid blow molding is performed by supplying not only the second liquid L2 but also the first liquid L1, in addition to the second liquid L2, to the preform 2 in the second molding step as in the present embodiment, the need for an opening-closing valve and control for stopping the supply of the first liquid L1 is omitted. Accordingly, the preform 2 is liquid blow molded into the liquid-containing container 50 with the easier and simplified configuration.

As described earlier, the liquid L supplied to the preform 2 in the presently disclosed liquid blow molding method is not limited to the mixed liquid, such as the enzyme liquid detergent as in the present embodiment, of the first liquid L1 that does not contain a heat-sensitive ingredient and the second liquid L2 that contains a heat-sensitive ingredient. A liquid, such as a seasoning dressing in which one liquid mainly composed of oil and another liquid mainly composed of water and having properties to be easily separated from oil are mixed, in which it is difficult to maintain the first and second liquids in the mixed state may also be used. In this case also, the presently disclosed liquid blow molding method allows a predetermined amount of the first liquid and a predetermined amount of the second liquid to be supplied to the preform 2 through separate systems at a predetermined ratio. Accordingly, the liquid-containing container holding the content liquid in which the first liquid and the second liquid are mixed at the predetermined ratio may be easily produced by liquid blow molding.

The present disclosure is not limited to the above embodiment, and various changes may be made without departing the gist of the present disclosure.

For example, although the above embodiment describes the case where the presently disclosed liquid blow molding method is implemented by using the liquid blow molding apparatus 1 with the configuration of FIG. 1, the presently disclosed liquid blow molding method may be implemented by using a differently configured liquid blow molding apparatus or the like.

Furthermore, although in the above embodiment the circulation step and the cleaning step, in addition to the first molding step and the second molding step, are performed, these steps may be omitted.

Moreover, a suck-back step may be performed after the cleaning step, that is, after the preform 2 is liquid blow molded into the container having the predetermined shape. The suck-back step may be performed for example by sucking a predetermined amount of the content liquid L fully filled inside the liquid-containing container 50 through a suction port provided at a tip of the stretching rod 29.

Moreover, although in the above embodiment the first liquid L1, in addition to the second liquid L2, is supplied to the preform 2 for liquid blow molding in the second molding step, the present disclosure is not limited to this embodiment. In the second molding step, only the second liquid L2 may be supplied by completely stopping the supply of the first liquid L1 for example by stopping the operation of the first pressurizing source 32 or closing an opening-closing valve disposed in the first pipe P1.

Moreover, although in the above embodiment the preform 2 is liquid blow molded into the halfway shape in the first molding step, the present disclosure is not limited to this embodiment. In the first molding step, the preform 2 may be fully filled with the first liquid L1 and molded into the container having the predetermined shape, and a predetermined head space may be created inside the container by suck-back or withdrawal of the stretching rod 29 before the second molding step, and the second liquid L2 may be supplied into the container in an amount less than or equal to the head space in the second molding step.

REFERENCE SIGNS LIST

1 Liquid blow molding apparatus
2 Preform
2a Mouth
2b Trunk
10 Mold
11 Cavity
20 Nozzle unit
21 Main body block
21a Support block
22 Blow nozzle
22a Sealing surface
23 Supply path
24 First supply port
25 Second supply port
26 Circulation port
27 Sealing body
27a Abutment surface
28 Shaft body
29 Stretching rod
30 First liquid supply unit
31 First tank
32 First pressurizing source
33 Second liquid supply unit
34 Second tank
35 Second pressurizing source
36 First opening-closing valve
37 Second opening-closing valve
38 Third opening-closing valve
39 Circulation control opening-closing valve
40 First pressure gauge
41 Second pressure gauge
50 Liquid-containing container
L Liquid (content liquid)
L1 First liquid
L2 Second liquid
P1 First pipe
P2 Second pipe
P3 Circulation pipe

The invention claimed is:

1. A liquid blow molding method for molding a bottomed tubular-shaped preform into a liquid-containing container in which a content liquid is held, the liquid blow molding method comprising:
   a first molding step of liquid blow molding the preform into a halfway shape by supplying, into the preform that has been heated to a predetermined temperature, a first liquid at a predetermined pressure through a nozzle; and
   a second molding step, performed after the first molding step, of liquid blow molding the preform by supplying the first liquid and a second liquid into the preform at a predetermined pressure through the nozzle, a pressure of the first liquid supplied to the preform in the second molding step being higher than a pressure inside the liquid blow molded preform, and a pressure of the second liquid supplied to the preform being the same as the pressure of the first liquid supplied to the preform, wherein:
      the second liquid is an enzyme liquid detergent containing an enzyme as an ingredient that is susceptible to degradation by heat, and
      the first liquid does not comprise the ingredient that is susceptible to degradation by heat.

2. The liquid blow molding method of claim 1, further comprising a circulation step, performed before the first molding step, of circulating the first liquid between a tank configured to hold the first liquid and the nozzle.

3. The liquid blow molding method of claim 1, wherein the enzyme in the second liquid is susceptible to denaturation or deactivation by heat.

4. The liquid blow molding method of claim 1, wherein the preform that has been heated to the predetermined temperature is cooled by the first liquid before supplying the second liquid to the preform so as to avoid degradation of the enzyme in the second liquid.

5. The liquid blow molding method of claim 1, further comprising a cleaning step, performed after the second molding step, of removing the second liquid out of the nozzle by liquid blow molding the preform by supplying only the first liquid into the preform at a predetermined pressure through the nozzle.

6. The liquid blow molding method of claim 5, further comprising a circulation step, performed before the first molding step, of circulating the first liquid between a tank configured to hold the first liquid and the nozzle.

* * * * *